(12) United States Patent
Tashjian

(10) Patent No.: US 8,919,549 B1
(45) Date of Patent: Dec. 30, 2014

(54) CELLULAR SHIELD CASE WITH TWISTABLE COVER

(76) Inventor: Richard Tashjian, Oradell, NJ (US)

( * ) Notice: Subject to any disclaimer, the term of this patent is extended or adjusted under 35 U.S.C. 154(b) by 0 days.

(21) Appl. No.: 13/478,588

(22) Filed: May 23, 2012

Related U.S. Application Data

(63) Continuation-in-part of application No. 12/883,697, filed on Sep. 16, 2010, now Pat. No. 8,205,744.

(51) Int. Cl.
   B65D 85/00     (2006.01)
   B65D 65/02     (2006.01)
   H04M 1/00      (2006.01)

(52) U.S. Cl.
   USPC .................. 206/320; 150/165; 455/578.8

(58) Field of Classification Search
   USPC .......... 206/305, 320; 150/165; 174/377–387;
                379/437, 440, 446, 451, 455;
                455/575.3, 575.5, 575.8
   See application file for complete search history.

(56) References Cited

U.S. PATENT DOCUMENTS

| 5,363,436 | A | * | 11/1994 | McMonagle et al. .... 379/355.01 |
| 5,692,046 | A | * | 11/1997 | Jambhekar ................ 455/575.3 |
| 5,819,162 | A | * | 10/1998 | Spann et al. .............. 455/575.5 |
| 6,075,977 | A | * | 6/2000 | Bayrami ................... 455/575.5 |
| 6,711,387 | B1 | * | 3/2004 | Lungley .................... 455/90.3 |
| 7,194,291 | B2 | * | 3/2007 | Peng ......................... 455/575.8 |
| 7,596,850 | B2 | * | 10/2009 | Barth et al. ..................... 29/594 |
| 7,601,921 | B2 | * | 10/2009 | Schroader ..................... 174/372 |
| 7,941,195 | B2 | * | 5/2011 | Peng ......................... 455/575.8 |
| 8,411,849 | B1 | * | 4/2013 | McKenzie et al. ............ 379/446 |
| 2003/0057131 | A1 | * | 3/2003 | Diaferia ........................ 206/320 |
| 2007/0259704 | A1 | * | 11/2007 | Jung ............................ 455/575.8 |
| 2011/0290676 | A1 | * | 12/2011 | Kershenstein ............... 206/320 |

FOREIGN PATENT DOCUMENTS

GB        2363003 A    * 12/2001

* cited by examiner

Primary Examiner — Bryon Gehman
(74) Attorney, Agent, or Firm — Richard A. Joel, Esq.

(57) ABSTRACT

The invention relates to carrying cases for wireless devices including cell phones, wireless tablets and laptop PC's which provide EMF shielding for the user. The wireless devices are inserted into a case comprising EMF shielding material and a cover including shielding material is flipped thereover to provide further radiation protection. The case involves several embodiments such as a flat flip case, a fixed bent edging flip case and a flexible folding edge flip case. A flip type case shielded cover added to existing wireless device open faced skin covers. Another embodiment of the invention involves a wireless device pocket shield wherein a shielded insulation envelope having a wireless device placed therein is dropped into an apparel pocket.

2 Claims, 12 Drawing Sheets

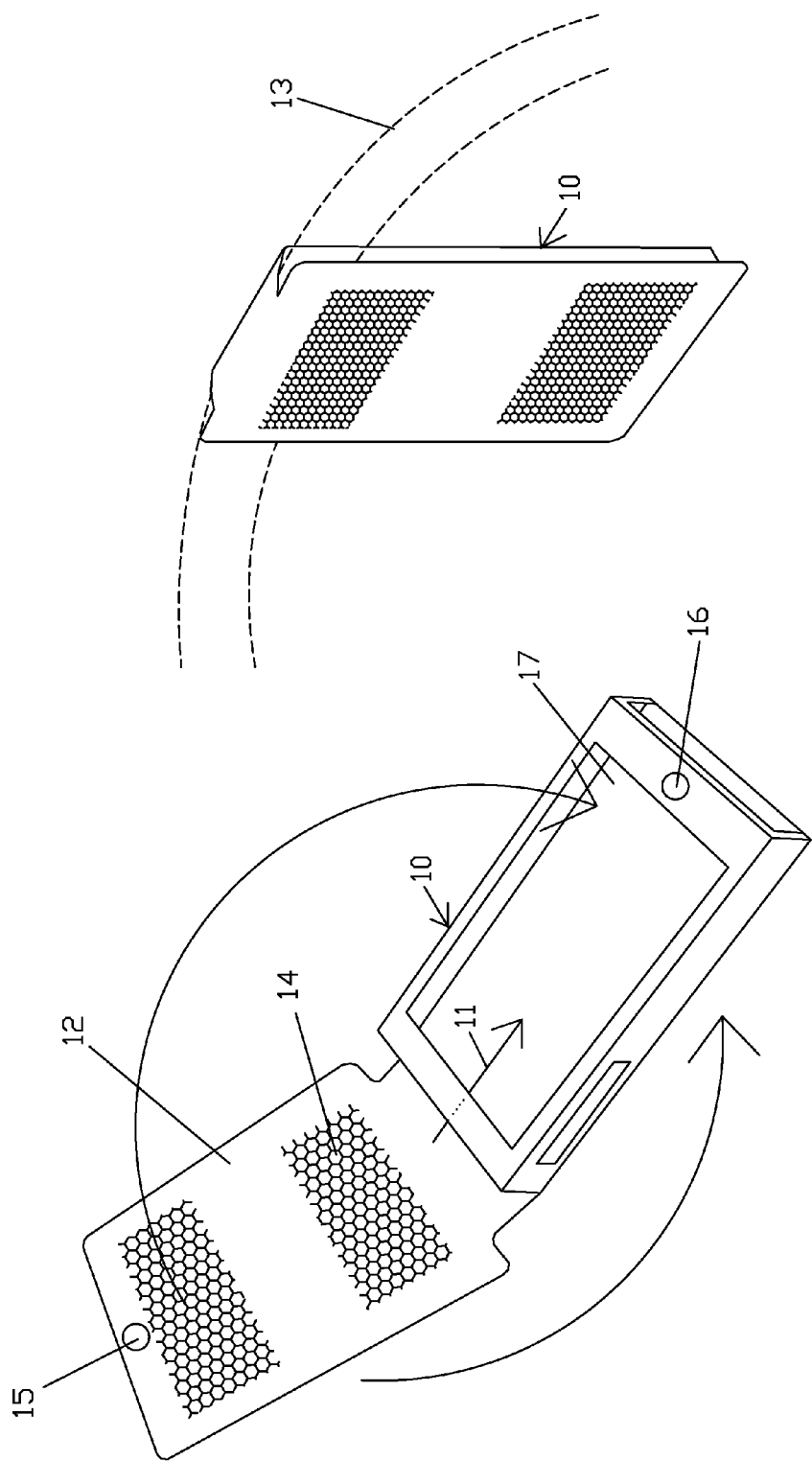

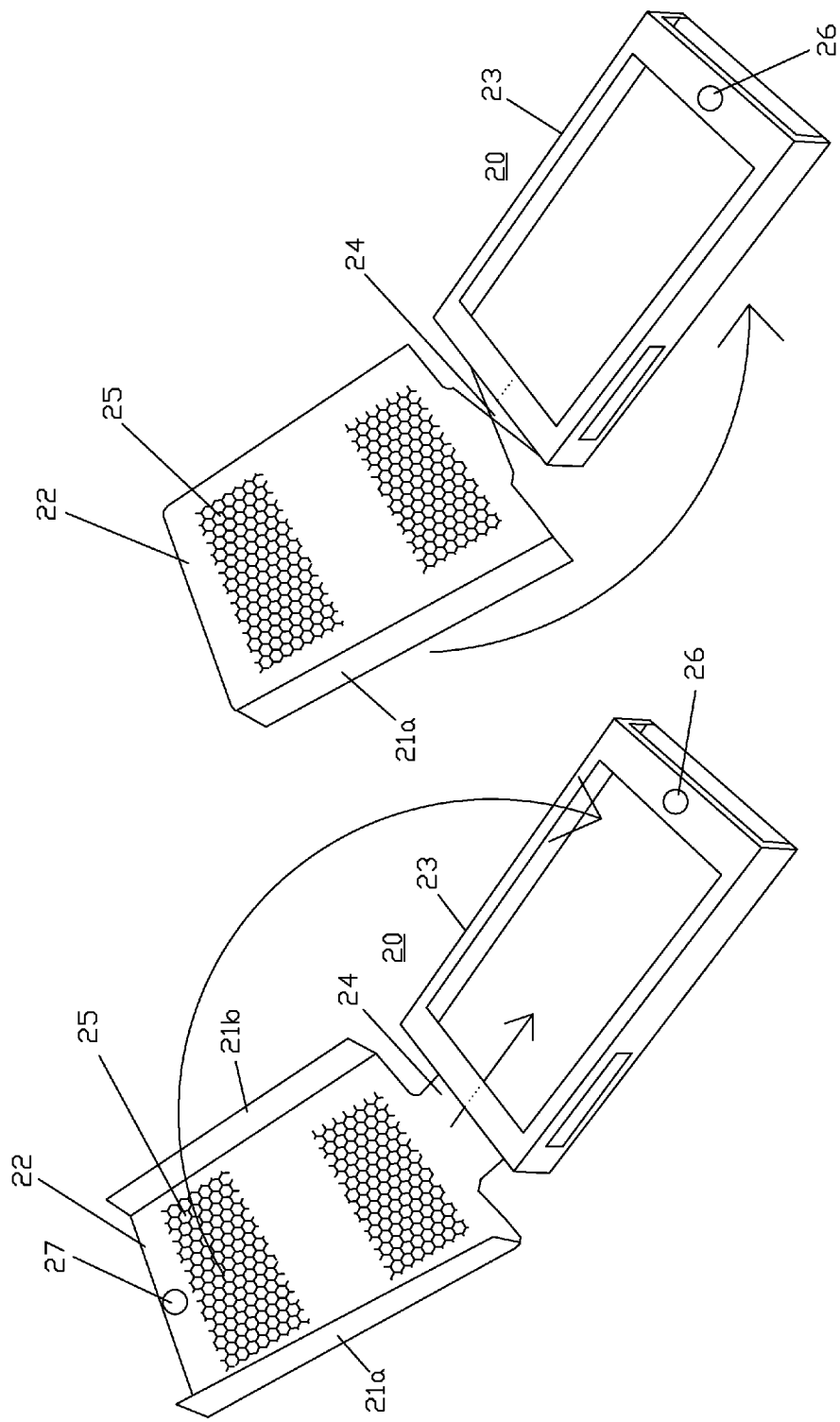

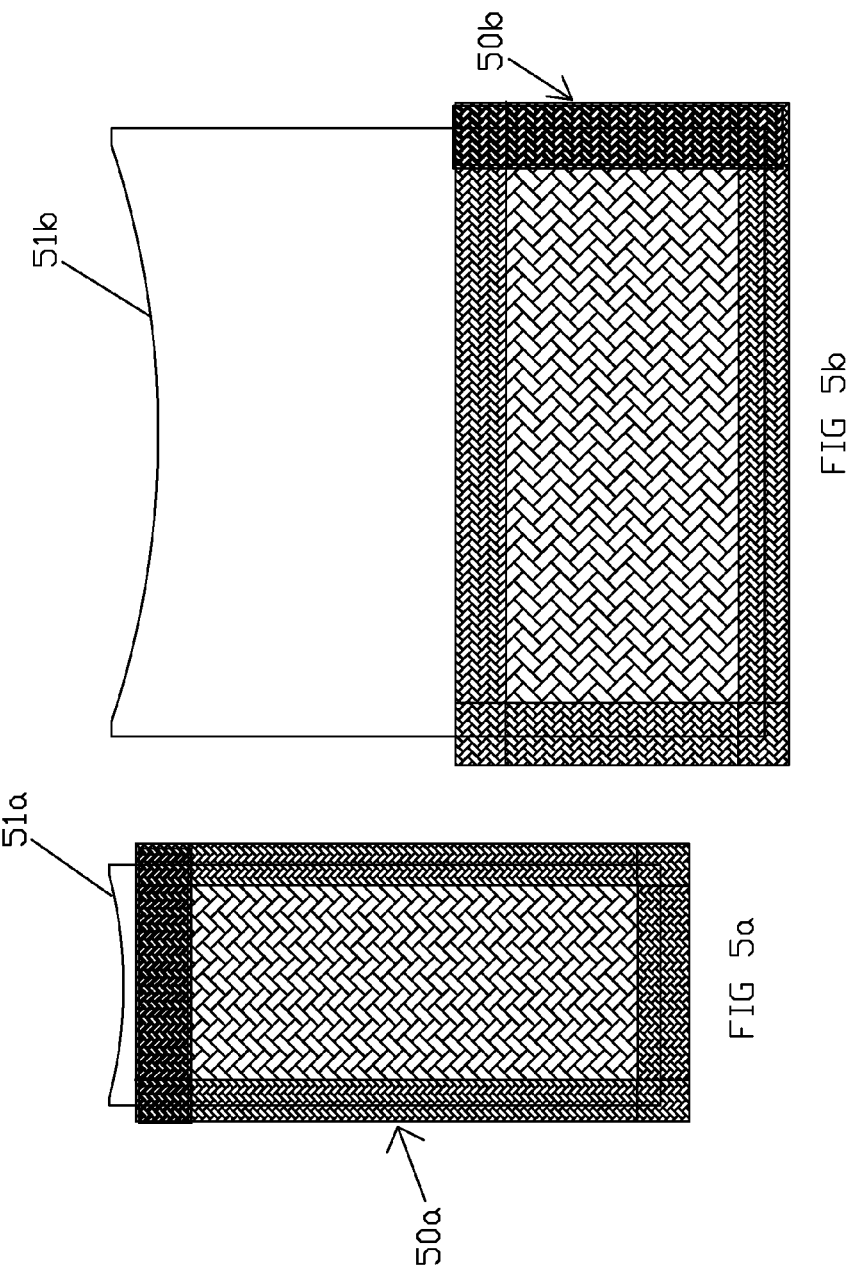

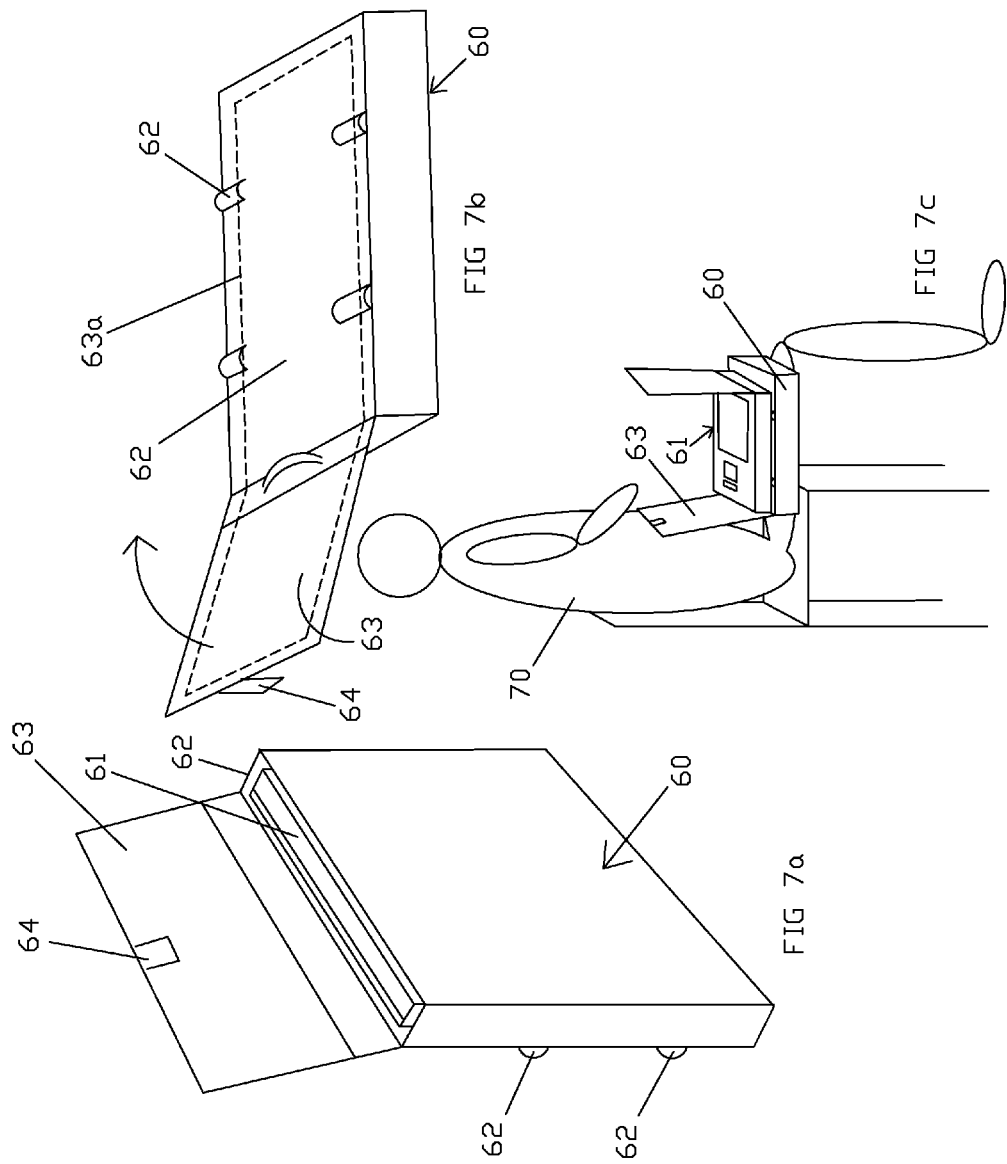

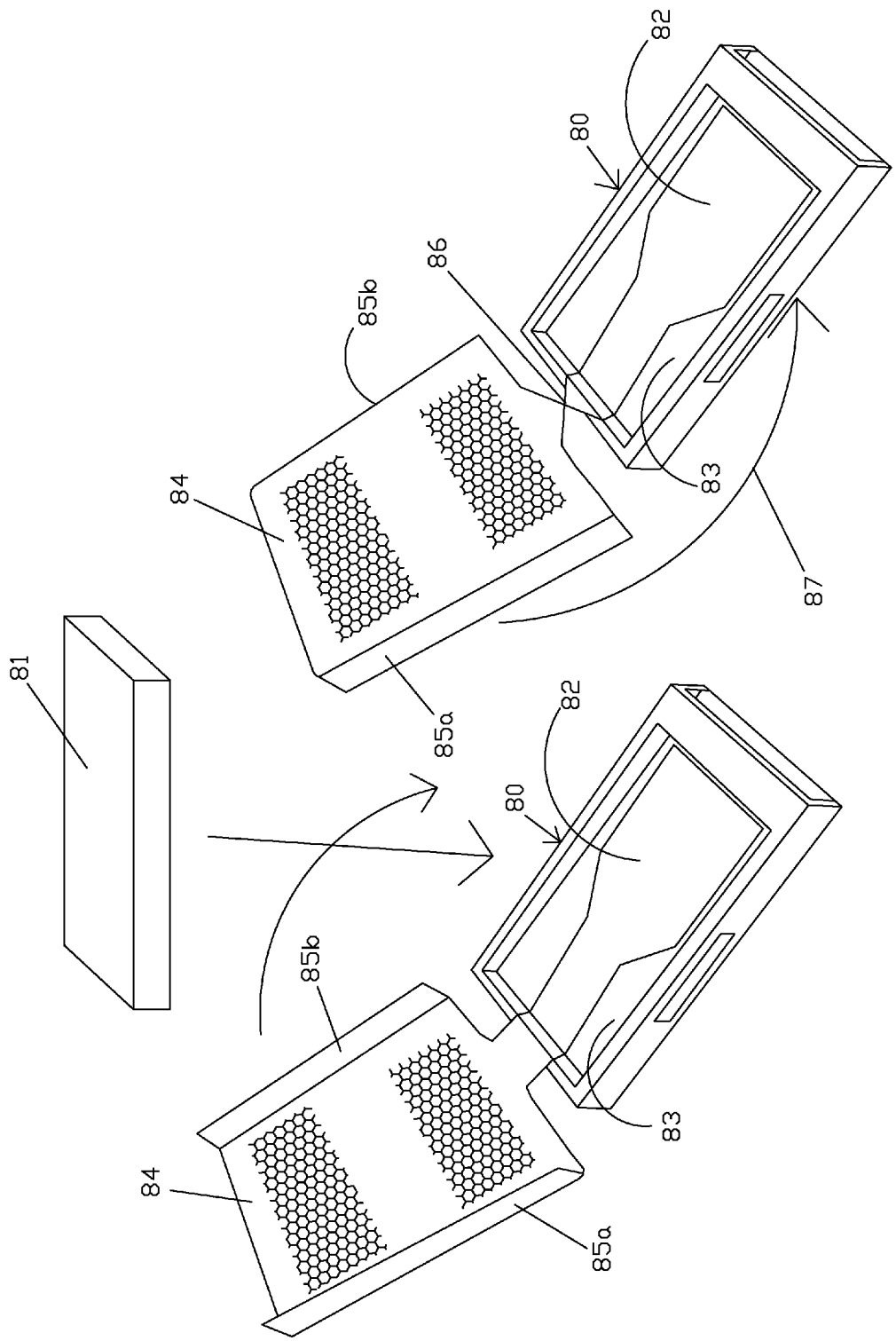

CELLULAR SHIELD CASE WITH TWISTABLE COVER

CROSS REFERENCE TO RELATED APPLICATIONS

This application is a Continuation-in-Part of application Ser. No. 12/883,697 filed Sep. 16, 2010 now U.S. Pat. No. 8,205,744.

STATEMENT REGARDING FEDERALLY SPONSORED RESEARCH OR DEVELOPMENT

Not Applicable

PARTIES TO A JOINT RESEARCH AGREEMENT

Not Applicable

DESCRIPTION

Background of the Invention

This novel invention relates to wireless devices (which encompasses cell phones, wireless tablets and/or laptop computers) and particularly to a shielding case, which substantially eliminates the dangers of electromagnetic radiation including but not limited to RF microwave and heat transference emitted from wireless devices. The shielding case also serves as a carrying case for the cellular phone. The invention discloses flat, fixed edging, and flexible edging flip cases for wireless devices, which provide essential shielding for the user.

This invention addresses the concerns over potential health hazards caused by the emission of EMF including but not limited to RF microwave radiation and heat emitted from wireless devices. The invention protects the user from such various types of radiation by using particular shielding technologies such as disclosed in U.S. Pat. Nos. 5,367,309, 6,515, 223 and U.S. Pat. No. 7,772,504 to Richard Tashjian as well as pending application Ser. No. 12/883,697. In the present invention, the shielding technology is contained within the storage case for cell phones (aka wireless devices) providing a unique mechanism to protect the wireless devices user.

The present invention focuses on shielding the user from harmful EMF including but not limited to RF microwave radiation and heat, while serving at the same time as a simple, lightweight/compact, protective, attractive, and sturdy case in which the user can carry a wireless device particularly a cell phone. The invention also makes cellular phones more readily and safely available by being able to store the phone on a computer case with a Velcro® accessory strip when placed in a Cellular Shield Case via the accessory Velcro® strip.

Prior art patents of interest in addition to applicant's previously cited U.S. Pat. Nos. 7,772,504; 6,515,223 and 5,367, 307 and application Ser. No. 12/883,697 include U.S. Pat. Nos. 7,036,642; 6,349,825; and, 5,124,899. None of the foregoing patents anticipates the unique features of this application. Cases for wireless devices are common but they are generally designed to protect the device not the user.

SUMMARY OF INVENTION

The present invention shields the laptop (aka wireless device) user from the harmful heat and the EMF generated including but not limited to RF microwave radiation emitted by a wireless device particularly when being used next to user's ear or carried on one's body. The shielding device or case includes a portion, which flips over itself as part of the carrying case and protects the wireless device when stored therein and the user when the phone is operational. The shield technology employed in this invention comprises conductive fabric positioned against a non-conductive plastic then rolled up onto itself on all four sides or can be bonded to each other for easier assembly. This permits a larger functionally effective virtual shielding area while having a physically smaller acting/functioning area. The EMF "sees/reacts" to this shielding area as a larger effective area than it actually is on the cell phone case.

Accordingly, an object of this invention is to provide a new and improved case for carrying wireless devices, which shields the user from harmful radiation.

Another object of this invention is to provide a new and improved flip case for wireless devices, which includes unique shielding elements to protect the user.

Another object of this invention is to provide a new and improved shielding case for wireless devices, which provides four-way protection against radiation whether used against one's head, carried on a belt, carried in a pocket or texting with one's hands.

Another object of this invention is to provide a unique pocket shield for safely carrying wireless devices in one's pocket.

A still further object of this invention is to provide a shielding messenger bag or similar casing for wireless devices having 4-point spacers on one side thereof to provide further protection for one's body.

BRIEF DESCRIPTION OF DRAWINGS

The above and other objects and advantages of the present invention may be more clearly seen when viewed in conjunction with the accompanying drawings wherein:

FIG. 1a shows a flat flip case for a cellular phone in an open position while FIG. 1b depicts a closed flat flip case mounted on a belt for shielding purposes, FIG. 1c depicts the shield in a forward position on the front of the phone while

FIG. 2a and FIG. 2b are perspective views of a fixed bent edging flip case for wireless devices with the case in an open position in FIG. 2a whereas FIG. 2b represents a second position of the case with the cover twisted 180 degrees to provide shielding when placed against the back of the wireless devices. FIG. 2c shows the shield in a front position in front of the phone while

FIG. 3b shows the shield in a front position in front of the pone while

FIG. 5a and FIG. 5b depict different front view versions of wireless device pocket protectors for various size apparel pockets which provide shielding for wireless devices;

FIG. 7a depicts an existing messenger bag type case or similar casing design for a cellular phone or wireless tablet including four point riser support on one face thereof to protect the user;

FIG. 7b is a perspective view showing the rear of the messenger bag of 7a or similar type casing and FIG. 7c shows the wireless device in use on one's lap; and shielded rear portion along phantom lines in FIG. 7b, FIGS. 8a and 8b are perspective views of using the flip shielding process incorporated/added to existing open-faced skin cover cases, which have been now converted into insulated shielding cases. All the same, previous benefits stated above apply with the added benefit of further protecting the device especially the screen if impacted in any way.

DETAILED DESCRIPTION OF THE INVENTION

Figure 1D:
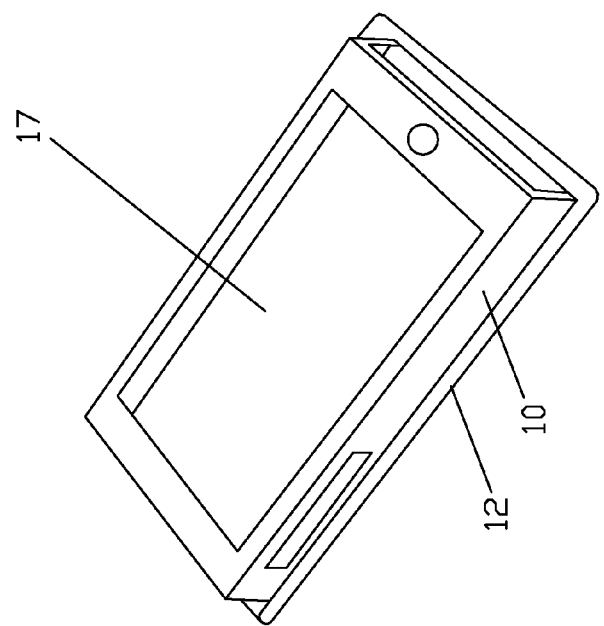
FIG. 1d depicts the cover shield in a rear position behind the phone.

Referring now to the drawings, this invention relates to primarily to cell phones, but also to wireless tablets and PC notebooks and well as more specifically to a shielding case for such apparatus which substantially eliminates the dangers of EMFs emitting therefrom. The shielding case substantially eliminates RF microwave radiation and heat emitted from these devices by providing enhanced EM insulation as more specifically described by applicant in his prior inventions cited herein.

The wireless device case designs include flat, fixed edging and flexible edging flip cases. All three designs provide four way shielding protection, namely, use against one's head, and use on a belt, pocket carrying, and texting with one's hands. This is accomplished by an EM insulation or shielding barrier in the flap portion of the case.

Figure 1C:
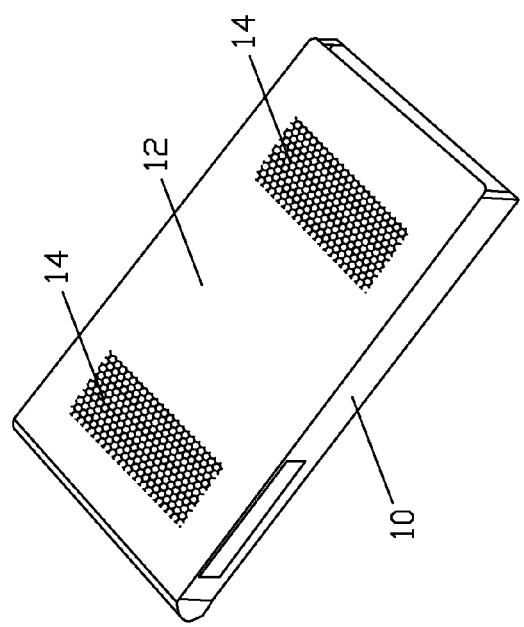

FIG. 1a and FIG. 1b disclose a flat flip case 10 having an aperture 17 wherein a cell phone (not shown) is inserted into the open end of the rectangular case 10 in the direction of the arrow 11. The cover or shielded flap 12 folds forward when the user is talking on the wireless device then flips backward completely behind the wireless device and is placed over the user's belt 13 as shown in FIG. 1b or in user's pocket to protect the user's body during storage. The cover 12 includes a predetermined number of holes 14, which extend partially therethrough for better audio transmitting through the cover shielding material. Mating Velcro® clasps 15 and 16 or similar closer apparatus are shown on the flap 12 and case 10. FIGS. 1c and FIG. 1d depict the cover 12 in forward and rear positions with respect to a cell phone.

Figure 2D:
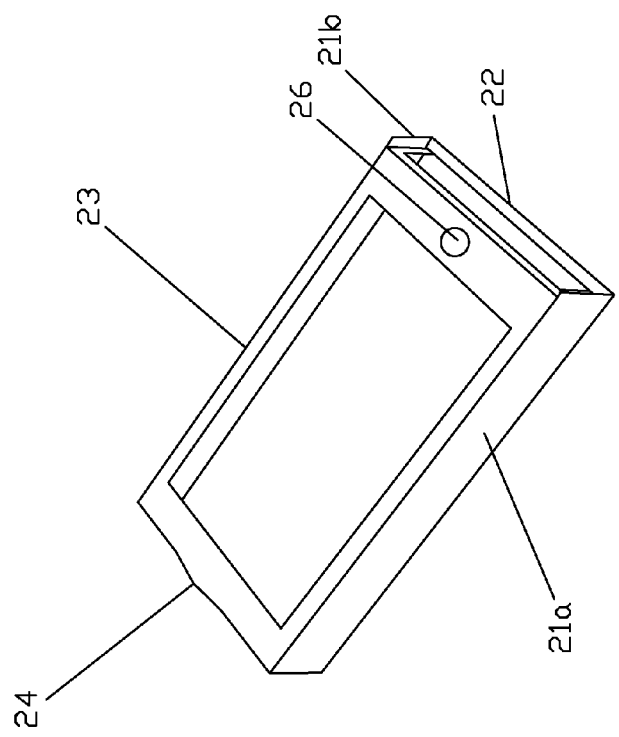
FIG. 2d shows the shield in a rear position behind the phone.
Figure 2C:
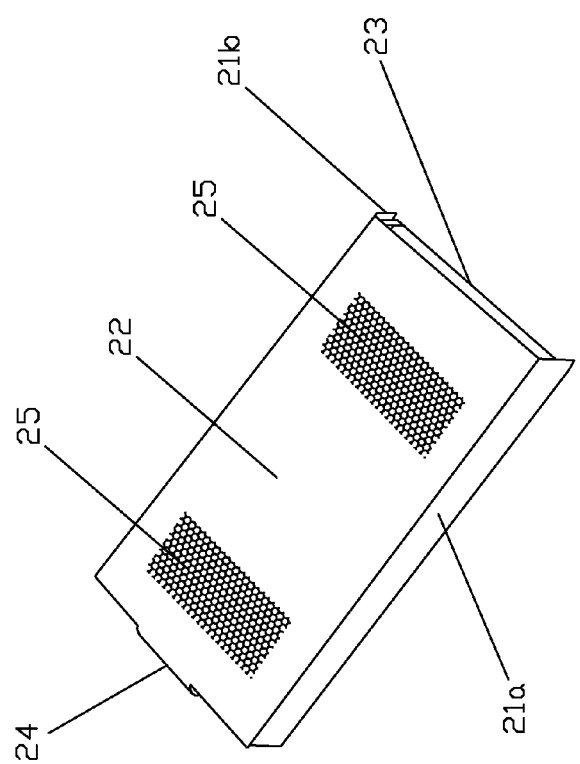

FIG. 2a and FIG. 2b discloses a fixed bent edging flip case 20 wherein the cover 22 includes side shielding members 21a and 21b and is attached to the case body 23 by elastic material 24 or some other flat material. A wireless device (not shown) is inserted into the case body 23 in the direction of the arrow. The cover 22 shows a plurality of holes 25, which may be any suitable number to facilitate the transmission of audio. The holes 25 may be on the outside or inside of the cover 22 and do not extend complete through the shielding material comprising the cover 22. As an option, the shielding cover 22 may be made thinner for audio purposes and the holes 25 eliminated. A hook and loop or magnetic closure 26, or other similar closer apparatus, on the case 23 engages member 27 on the cover 22 to close the case 23. In use, the cover 22 may be twisted 180 degrees as shown in FIG. 2b and folded over the case 20 in the direction of the arrow to provide rear shielding when needed. FIG. 2c and FIG. 2d depict the shield 12 in front and rear positions with regard to the cell phone.

Figure 3:
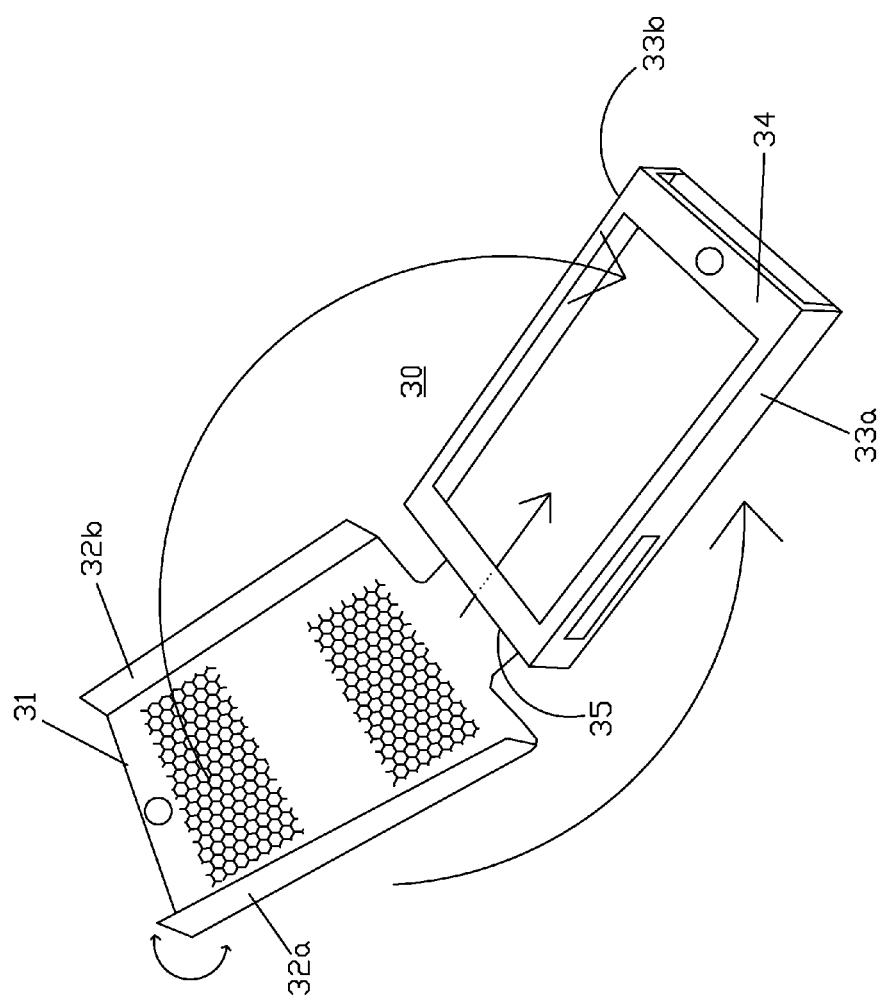
FIG. 3 discloses a flexible folding edge flip case for a cellular phone in a perspective view with the cover open.
Figure 3C:
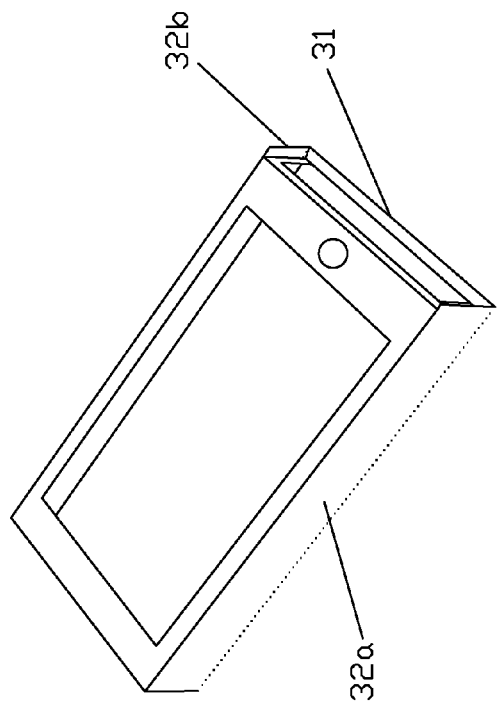
FIG. 3c shows the shield in a rear position behind the phone.
Figure 3B:
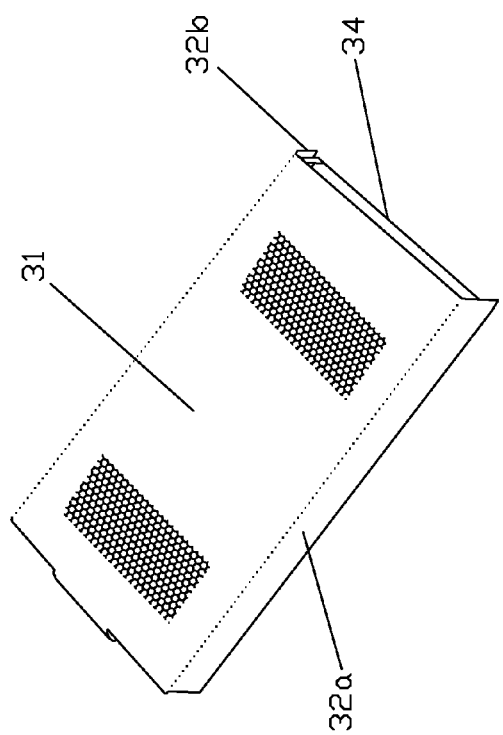

FIG. 3 discloses a flexible folding edge flip case 30 for wireless devices. The cover 31 includes foldable sides 32a and 32b, which engage the sides 33a and 33b respectively, of the case body 34. The wireless devices (not shown) is inserted into the opened aperture 35 at one end of the case. The shielded cover 31 flips forward and rearwardly over the case body 34 for shielding purposes depending on whether the user is speaking on the phone, holding, or storing the phone (see arrows). FIG. 3b and FIG. 3c show the shield 12 in a forward and rear position with respect to the cell phone.

Figure 4:
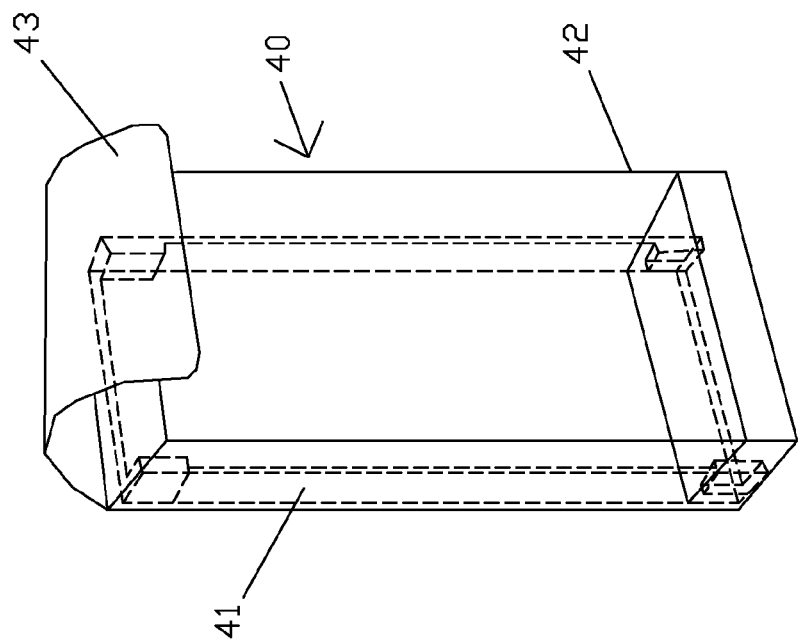
FIG. 4 discloses a closed face type shielding case for wireless devices with shielded portion shown in phantom inside the case within which a wireless device is inserted.

FIG. 4 discloses a closed face type case 40 for a wireless device wherein the shielding 41 is shown in phantom mounted within the inner case body 42. A top cover 43 fits over the case body 42 to keep the cell phone in place within the case 40. As an optional benefit, the wireless device can also be used in case, while in talking mode, through the shielded portion of case.

FIGS. 5a and 5b show the wireless device shield pocket 50a and 50b which are placed in different apparel pocket sizes 51a or 51b respectively. The arrangement provides shielding when a wireless device is placed in a pocket for storage or when it is used with a headset. One simply drops the device into a shield pocket opening in a shirt or coat pocket to protect the user's body. The cellular shield pocket 50a or 50b can also be incorporated into existing phone cases.

Figure 6B:
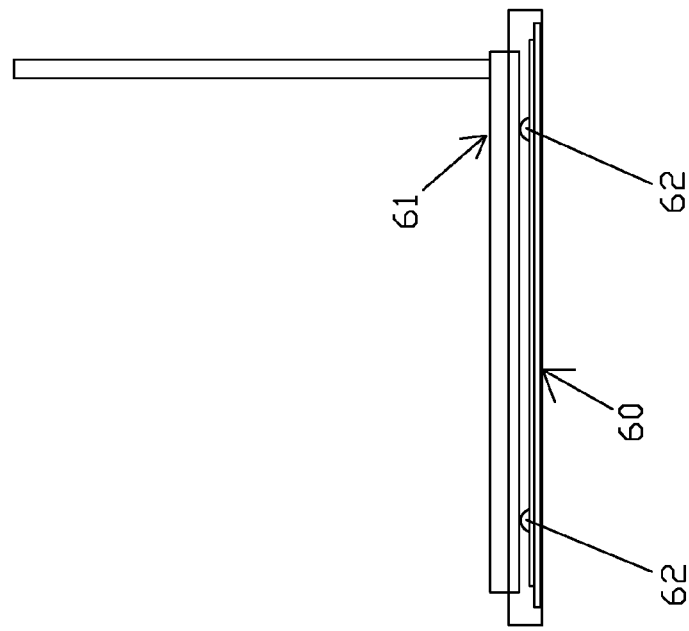
FIGS. 6a (case closed) and 6b (case opened) are side views of a wireless device here a laptop PC positioned with a spacer portion for shielding and cooling purposes incorporated in a existing case design.
Figure 6A:
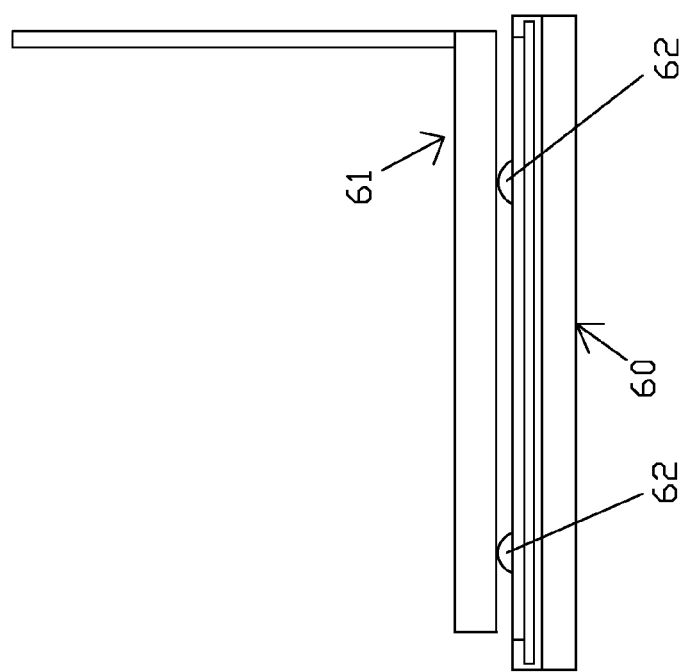

As shown in FIGS. 6a and 6b (closed and open case positions respectfully) and FIGS. 7a-7c, the shielding apparatus can be implemented inside existing cellular phone, wireless tablets and laptop cases and/or sleeves by simply varying its overall shape and/or size to protect the user. In FIGS. 6a and 6b, a laptop 61 is positioned on a shielding case 60 and 4-point risers 62 are included to raise the laptop computer or other device 61 so as not to obstruct the airflow need for 2 directional cooling.

FIG. 7a depicts the shielded messenger bag or similar type case 60 of FIGS. 6a and 6b wherein the wireless device 61 is inserted into an aperture 62 in the case 60. The cover 63 with catch 64 is then allowed to lean against the user's abdomen/chest while in use on the users lap or chest regions for complete EMF protection. The 4-point risers 62 are shown clearly in FIG. 7b. FIG. 7c shows the laptop 62 in use on the case 60 to provide total body shielding for the user 70. The shielded region is denoted by the phantom lines 63a in FIG. 7b.

Figure 8D:
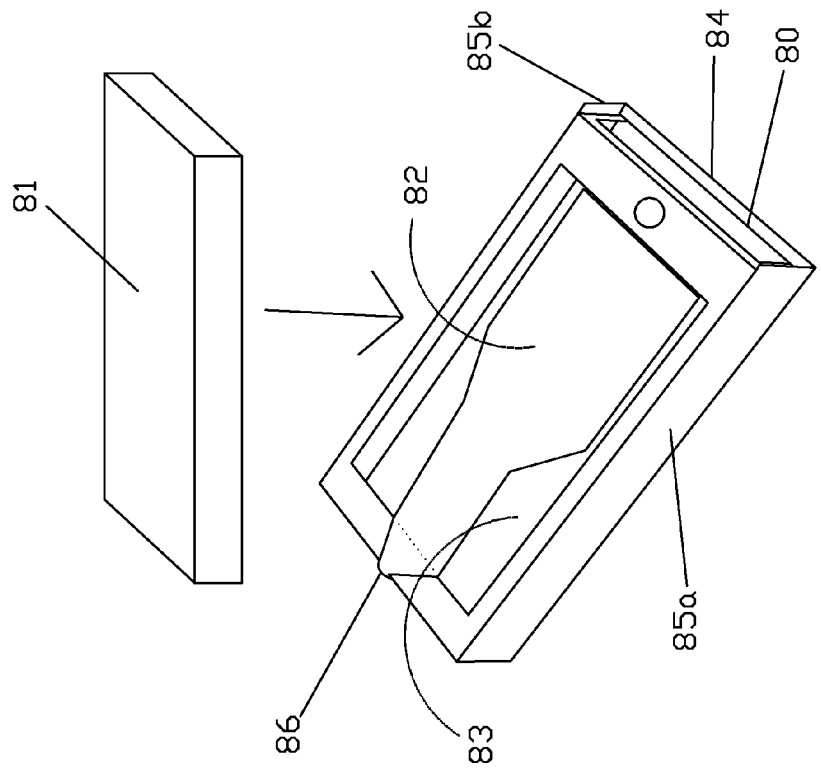
FIGS. 8c and 8d depict the cover shield in a forward position and a rear position with respect to the cell phone.
Figure 8C:
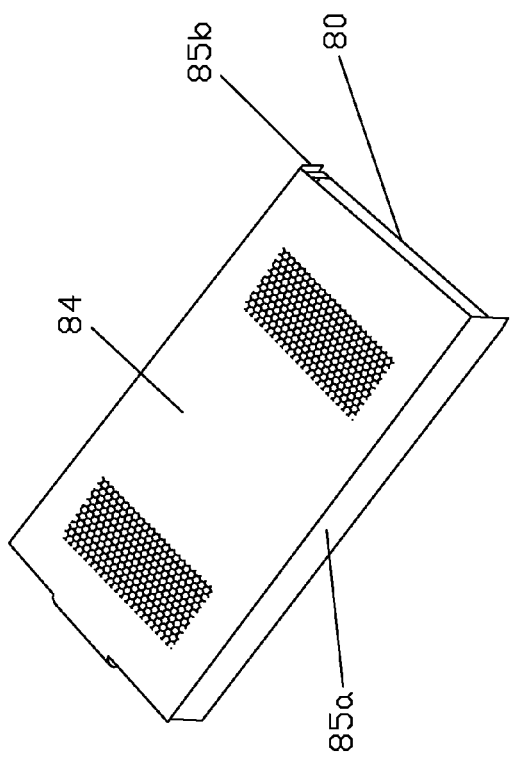

FIGS. 8a and 8b depict an existing open face skin cover case 80 into which a cell phone 81 is snapped. An insulating strip 82 comprised of a thin durable material is positioned within case 80 against the rear wall 83 before the cell phone 81 is snapped inside it. The strip 82 is attached to the EM shielded flip cover 84 with sides 85a and 85b, which is folded over the phone 81 when in use. The cover 84 is twisted 180 degrees as shown in FIG. 8b at the juncture 86 and positioned as shown by the arrow 87 over the rear of the case 80 to shield the user when placed on a belt, pocket or when texting (not shown). FIGS. 8c and 8d depict the cover 84 in a front and rear position with respect to the phone 81.

While the invention has been explained by a detailed description of certain specific embodiments, it is understood that various modifications and substitutions can be made in any of them within the scope of appended claims, which are intended also to include equivalents of such embodiments.

What is claimed is:
1. An open face shielding wireless device case comprising:
a substantially rectangular shielding case having an open face on one side thereof for insertion of a cell phone and having a rear wall on the opposite side thereof;
a flexible insulating strip positioned adjacent the rear wall;

an insulating shielded cover flexibly connected to the strip and extending outwardly from said shielding case, said cover having elongated sides and being positioned over the phone when in use and capable of being twisted 180 degrees into a reverse position when the wireless device is stored or held in hand.

2. A flip-type shielding case for a cell phone to protect a user comprising:

a substantially rectangular shielding case having an opening at one end to store a cell phone and having opposite elongated surfaces and a pair of spaced transverse surfaces each joining the elongated surfaces;

a pivotal shielding cover extending outwardly along one of the transverse surfaces adjacent the opening, said shielding cover being capable of being flipped in front of the cell phone to protect the user when talking on the phone and said shielding section being flipped backwards behind the cell phone to facilitate storage of the case on one's person or in hand while providing continued EMF protection; and wherein, the cover further includes outwardly extending sides which bend to engage the transverse surfaces on the case and wherein the cover further includes a section of thin elastic durable material connected to the the case wherein the cover may be twisted 180° to engage the reverse side of the case.

\* \* \* \* \*